(12) United States Patent
Smith et al.

(10) Patent No.: US 12,532,975 B2
(45) Date of Patent: Jan. 27, 2026

(54) DISPLAY ASSEMBLIES

(71) Applicant: ALL PLASTIC, INC., Rancho Cordova, CA (US)

(72) Inventors: William Thomas Smith, Fair Oaks, CA (US); Cheryl Ann Smith, Fair Oaks, CA (US)

(73) Assignee: ALL PLASTIC, INC., Rancho Cordova, CA (US)

( * ) Notice: Subject to any disclaimer, the term of this patent is extended or adjusted under 35 U.S.C. 154(b) by 15 days.

(21) Appl. No.: 18/675,390

(22) Filed: May 28, 2024

(65) Prior Publication Data

US 2024/0398136 A1    Dec. 5, 2024

Related U.S. Application Data

(60) Provisional application No. 63/469,477, filed on May 29, 2023.

(51) Int. Cl.
 *A47F 3/14* (2006.01)
 *A47F 7/28* (2006.01)

(52) U.S. Cl.
 CPC .............. *A47F 3/145* (2013.01); *A47F 7/285* (2013.01)

(58) Field of Classification Search
 CPC ................................. A47F 3/145; A47F 7/285
 USPC ........................................ 248/553, 114, 116
 See application file for complete search history.

(56) References Cited

U.S. PATENT DOCUMENTS

| | | |
|---|---|---|
| 1,047,366 A | 12/1912 | Alston |
| 3,964,603 A | 6/1976 | Sandler |
| 4,486,169 A | 12/1984 | Lewis |
| D305,586 S | 1/1990 | Wombacher |
| D306,964 S | 4/1990 | Zupancic |
| 5,685,436 A | 11/1997 | Davet |
| D410,052 S | 5/1999 | Davis et al. |
| 5,931,549 A | 8/1999 | Lindberg |
| D599,193 S | 9/2009 | Meyer et al. |
| D599,194 S | 9/2009 | Meyer et al. |
| D608,183 S | 1/2010 | Meyer et al. |
| 7,922,267 B2 | 4/2011 | Gevaert |
| 7,926,430 B2 | 4/2011 | Bakker et al. |
| 8,020,816 B2 * | 9/2011 | Laitila .................. F16M 11/041 248/125.7 |
| 8,074,581 B2 | 12/2011 | Epstein et al. |
| 8,292,097 B2 | 10/2012 | Goldberg |
| 8,360,373 B2 | 1/2013 | Johnson et al. |
| 8,523,122 B2 * | 9/2013 | Johnson ................. F16M 11/00 340/568.8 |
| 8,814,128 B2 | 8/2014 | Trinh et al. |

(Continued)

*Primary Examiner* — Anita M King
(74) *Attorney, Agent, or Firm* — WOMBLE BOND DICKINSON (US) LLP

(57) ABSTRACT

A display assembly for secure display of articles includes: (a) a display stand including a base securable to a secure support surface and a platform detachably mounted to and concealing the base; (b) at least one display container supported atop and fastened to the platform, at least a portion of the display container being generally transparent for viewing one or more articles containable therein for display; and (c) a locking mechanism integrated with the display stand, the locking mechanism operable to securely lock the platform to the base to prevent detachment of the platform from the base and unlock the platform from the base to permit detachment of the platform from the base.

19 Claims, 8 Drawing Sheets

(56) References Cited

U.S. PATENT DOCUMENTS

| | | | |
|---|---|---|---|
| D729,043 S | 5/2015 | Poppell | |
| D759,466 S | 6/2016 | Tonthat et al. | |
| 9,615,677 B2 | 4/2017 | Trinh et al. | |
| 9,630,747 B2 | 4/2017 | Smith et al. | |
| 9,664,336 B2 * | 5/2017 | Ewen, III | F16M 13/02 |
| D789,180 S | 6/2017 | Webb | |
| D848,819 S | 5/2019 | French | |
| D880,462 S | 4/2020 | Nakamura | |
| D884,461 S | 5/2020 | Allen et al. | |
| D939,933 S | 1/2022 | Campbell | |
| 11,235,909 B2 | 2/2022 | Smith et al. | |
| D953,183 S | 5/2022 | Dong et al. | |
| D965,355 S | 10/2022 | Fink et al. | |
| 11,672,360 B2 * | 6/2023 | Day | B65D 43/0208 206/315.9 |
| 11,680,675 B2 * | 6/2023 | Gulick, Jr. | E05B 73/0082 248/553 |
| 11,771,238 B2 * | 10/2023 | Smith | A47F 3/002 362/125 |
| D1,012,682 S | 1/2024 | Huang | |
| D1,013,382 S | 2/2024 | Rutsche et al. | |
| D1,019,348 S | 3/2024 | Palmer et al. | |
| D1,020,827 S | 4/2024 | Ando et al. | |
| 12,303,044 B2 * | 5/2025 | Smith | A47F 3/145 |
| 2002/0030025 A1 | 3/2002 | Sipe | |
| 2006/0000955 A1 | 1/2006 | Cvek | |
| 2007/0152545 A1 | 7/2007 | Tranter et al. | |
| 2011/0062294 A1 | 3/2011 | Johnson et al. | |
| 2014/0027390 A1 | 1/2014 | Reynolds et al. | |
| 2014/0120481 A1 | 5/2014 | Buchbinder | |
| 2015/0208826 A1 | 7/2015 | Yang et al. | |
| 2020/0113353 A1 | 4/2020 | Bigioni et al. | |

\* cited by examiner

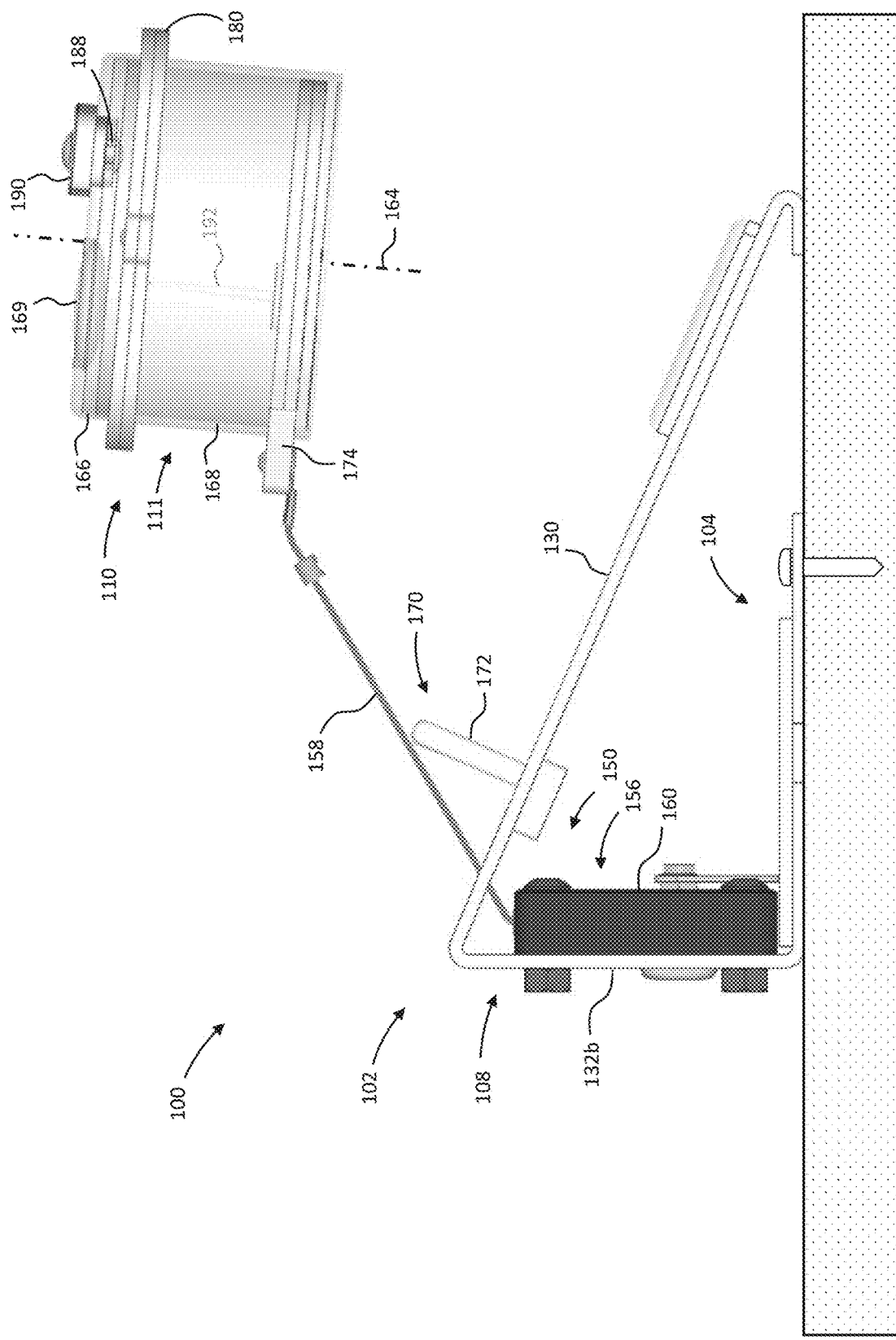

DISPLAY ASSEMBLIES

CROSS-REFERENCE TO RELATED APPLICATION(S)

This application claims the benefit of U.S. Provisional Patent Application No. 63/469,477 filed May 29, 2023 and entitled "DISPLAY ASSEMBLIES", which is hereby incorporated herein in its entirety.

FIELD

The specification relates generally to display of articles, and more specifically, to display assemblies for securely displaying articles.

BACKGROUND

U.S. Pat. No. 9,630,747 B2 (Smith et al.) discloses a container for displaying, visualizing, and aroma sampling botanical materials-such as tea, cannabis, and the like including a container body, lid, and lens. The container body is shaped to define a mounting projection wherein a sample, such as a botanical sample, may be held. Container body and lid form an airtight seal. A sample may be visualized through the lens. In a preferred embodiment, lid is shaped to define scent openings permitting aroma sampling of a sample contained within. In one embodiment option, one or more projections secure a card bearing sample identification information.

SUMMARY

The following summary is intended to introduce the reader to various aspects of the applicant's teaching, but not to define any invention.

According to some aspects, a display assembly for secure display of articles includes (a) a display stand having a base securable to a secure support surface and a platform detachably mounted to and concealing the base, the platform having a top wall and a sidewall extending downwardly from a periphery of the top wall to an underside of the platform opposite the top wall, the underside having an opening receiving the base to enclose the base within the platform; (b) at least one display container supported atop and fastened to the platform, at least a portion of the display container being generally transparent for viewing one or more articles containable therein for display; and (c) a locking mechanism integrated with the display stand, the locking mechanism moveable between a locked position for securely locking the platform to the base to prevent detachment of the platform from the base, and an unlocked position for unlocking the platform from the base to permit detachment of the platform from the base.

In some examples, the sidewall horizontally circumscribes the base for concealment thereof.

In some examples, when the locking mechanism is in the unlocked position, the platform is horizontally slidable along the base between a disconnected position in which the platform is clear of the base to permit lifting of the platform off the base, and an interconnected position in which the platform is interlocked with the base to inhibit lifting of the platform off the base and the locking mechanism is movable to the locked position to lock the platform in the interconnected position.

In some examples, the base is sized for positioning within the opening in close lateral fit to inhibit lateral movement of the platform relative to the base while accommodating axial translation of the platform relative to the base between the interconnected and disconnected positions.

In some examples, the base has a recess open horizontally and bounded from above by a catch surface fixed to the base, and the platform has a horizontal projection on the underside of the platform, the projection received in the recess for engagement with the catch surface when the platform is in the interconnected position to interlock the platform with the base, and the projection removed from the recess clear of the catch surface when the platform is in the disconnected position.

In some examples, the projection comprises a bottom wall portion of the platform projecting horizontally from the sidewall to an inner edge defining a periphery of the opening.

In some examples, the locking mechanism includes at least one latch rotatably mounted to the platform and at least one strike surface fixed relative to the base, the latch positioned for engagement with the strike surface when the locking mechanism is in the locked position, and the latch clear of the strike surface when the locking mechanism is in the unlocked position.

In some examples, the base includes one or more mounting features for securing the base to the support surface, the mounting features inaccessible when the base is secured to the support surface and the platform is mounted to the base, and the mounting features accessible when the platform is detached from the base.

In some examples, the display assembly further includes at least one retractable tether securely fastening the at least one display container to the platform, each retractable tether permitting limited movement of the display container away from the platform to facilitate viewing of the one or more articles, and urging the display container back toward a resting position atop the platform.

In some examples, the retractable tether is mounted within an interior of the platform and extends to the display container through a tether port in the top wall of the platform.

In some examples, the display stand has at least one stop member projecting from an exterior surface of the top wall and positioned generally forward of the tether port, the stop member limiting rearward movement of a respective display container past the resting position.

In some examples, the display container extends along a container axis between a top and a bottom vertically opposite the top, the top comprising a generally transparent viewing surface normal to the container axis and through which the articles are viewable.

In some examples, the top wall slopes downwardly from a rear to a front of the platform, and when in the resting position, the display container is supported atop the top wall with the viewing surface inclined from horizontal toward the front of the display stand to facilitate viewing of the one or more articles.

In some examples, the display assembly further includes an information display system integrated with the display stand adjacent the display container for displaying information about the one or more articles. In some examples, the display system comprises at least one card holder attached to the top wall of the platform and shaped to receive and hold an information card providing the information about the one or more articles.

According to some aspects, a display assembly for secure display of articles includes: (a) a display stand including a base securable to a secure support surface and a platform detachably mounted to and concealing the base; (b) at least one display container supported atop and fastened to the platform, at least a portion of the display container being generally transparent for viewing one or more articles containable therein for display; and (c) a locking mechanism integrated with the display stand, the locking mechanism moveable between a locked position for securely locking the platform to the base to prevent detachment of the platform from the base, and an unlocked position for unlocking the platform from the base to permit detachment of the platform from the base. In some examples, the base is enclosed within the platform.

In some examples, the display assembly further includes a retractable tether securely fastening the display container to the platform, the retractable tether permitting limited movement of the display container away from the platform to facilitate viewing of the one or more articles, and urging the display container back toward a resting position atop the platform.

In some examples, the retractable tether is mounted within the platform and extends to the display container through a tether port in the platform.

According to some aspects, a display assembly for secure display of articles includes: (a) a display stand including a base securable to a secure support surface and a platform detachably mounted to and concealing the base; (b) at least one retractable tether mounted within the platform and extending through a tether port in the platform to an exterior environment for fastening a display container to the platform, the tether permitting limited movement of the display container away from the platform to facilitate viewing of one or more articles in the display container, and urging the display container back toward a resting position atop the platform; and (c) a locking mechanism integrated with the display stand, the locking mechanism moveable between a locked position for securely locking the platform to the base to prevent detachment of the platform from the base, and an unlocked position for unlocking the platform from the base to permit detachment of the platform from the base.

BRIEF DESCRIPTION OF THE DRAWINGS

The drawings included herewith are for illustrating various examples of apparatuses and methods of the present specification and are not intended to limit the scope of what is taught in any way. In the drawings:

FIG. 8 is a cross-sectional view like that of FIG. 2, but showing the display container extended away from the platform.

DETAILED DESCRIPTION

Various apparatuses or processes will be described below to provide an example of an embodiment of each claimed invention. No embodiment described below limits any claimed invention and any claimed invention may cover apparatuses or processes that differ from those described below. The claimed inventions are not limited to apparatuses or processes having all of the features of any one apparatus or process described below or to features common to multiple or all of the apparatuses or processes described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors, or owners do not intend to abandon, disclaim, or dedicate to the public any such invention by its disclosure in this document.

In retail or other environments, it may be desirable or necessary to display articles for sale in secure display containers. The containers can be locked and tamper-proof to prevent patrons from touching the articles being displayed therein. The containers may also be fastened to a secure surface at a display location through, for example, a tether to allow patrons to handle and manipulate the display containers for viewing and/or sampling an aroma of the articles contained therein while deterring theft or misplacement of the containers. The present application discloses examples of display assemblies for securely displaying articles in secure display containers fastened at a display location. The display assemblies can allow for convenient detachment and reattachment of the display containers for transport away from and back to the display (or other) location. This can facilitate, for example, servicing, replacement, and/or more secure storage (e.g. during store closure, overnight, etc.) of the display containers and/or articles contained therein. The articles can include, for example, aromatic botanical specimens such as, for example, cannabis specimens.

Figure 1:
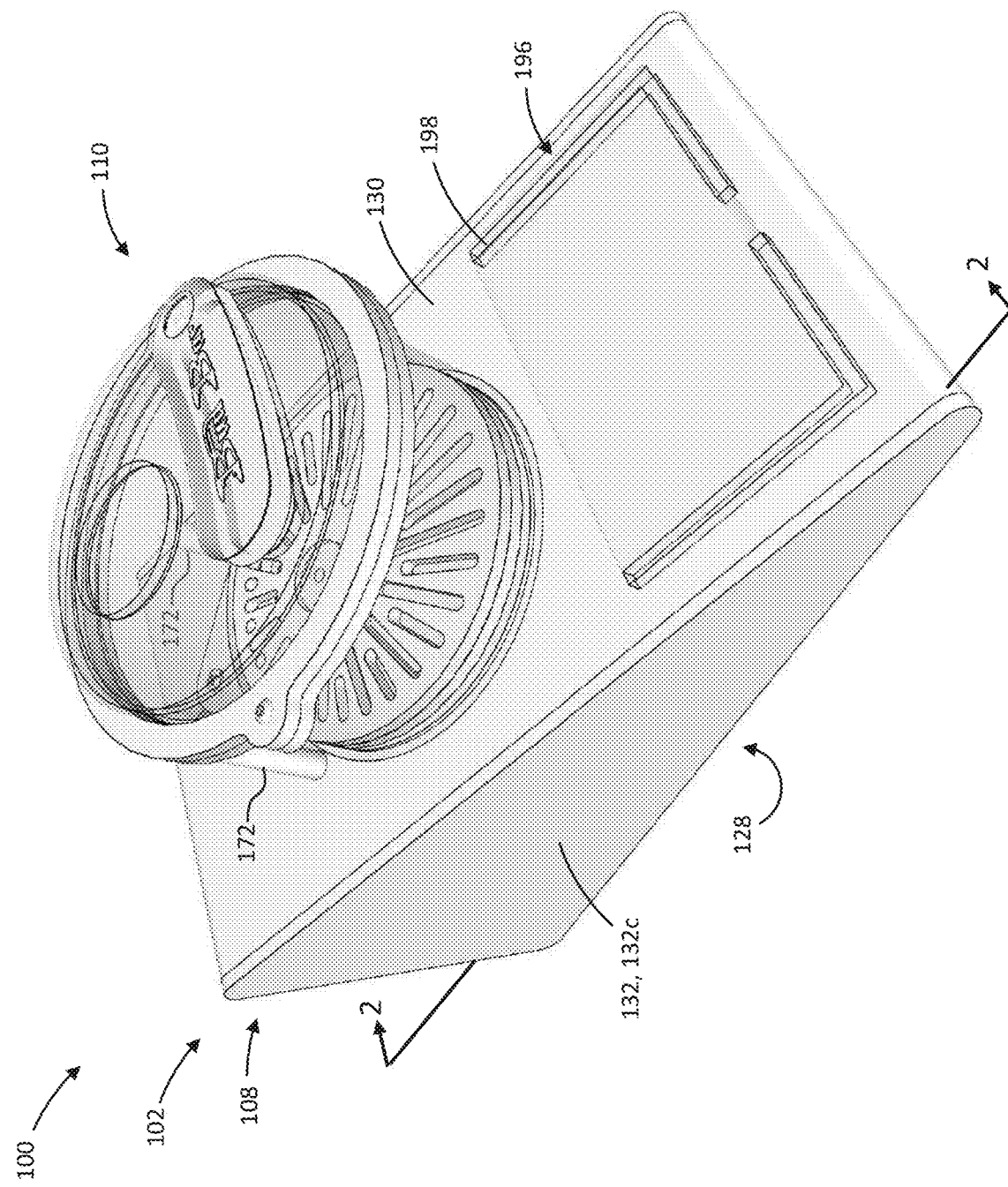
FIG. 1 is a perspective view of an example display assembly.
Figure 2:
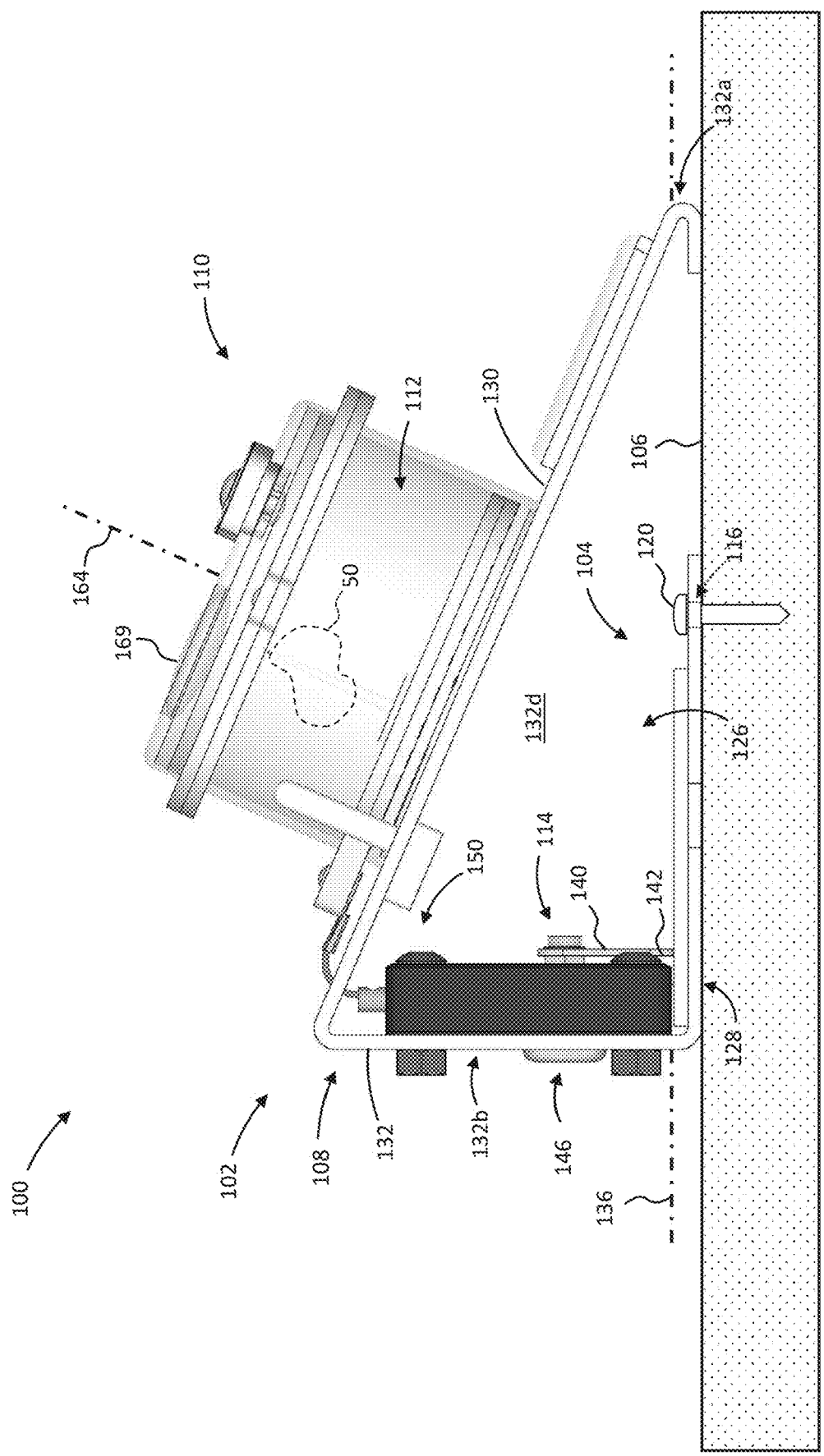
FIG. 2 is a cross-sectional side view of the display assembly of FIG. 1, taken along line 2-2 in FIG. 1, showing a display container supported atop a platform locked to a base of the display assembly.

Referring to FIG. 1, an example display assembly 100 for secure display of articles is illustrated. Referring to FIG. 2, in the example illustrated, the display assembly 100 includes a display stand 102 having a first portion (in the form of a base 104 in the example illustrated) securable to a secure support surface 106 and a second portion (in the form of a platform 108 in the example illustrated) detachably mounted to the base 104. The support surface 106 can comprise a permanent and/or semi-permanent fixture or structure such as, for example, a counter, table, worksurface, and/or other construction to which the display assembly 100 can be securely mounted to help prevent removal of the display assembly 100 from the premises while on display.

In the example illustrated, the display assembly 100 further includes at least one display container 110 adjacent the display stand 102. In the example illustrated, the display container 110 is supported atop and fastened to the platform 108. The display container 110 has a generally enclosed container interior 112 for containing one or more articles 50 (shown schematically in FIG. 2) for display, and in the example illustrated, is locked and generally tamper-proof to prevent patrons from touching the articles 50 being displayed therein. At least a portion of the container 110 is generally transparent to allow for viewing of the articles 50 contained therein.

Figure 3:
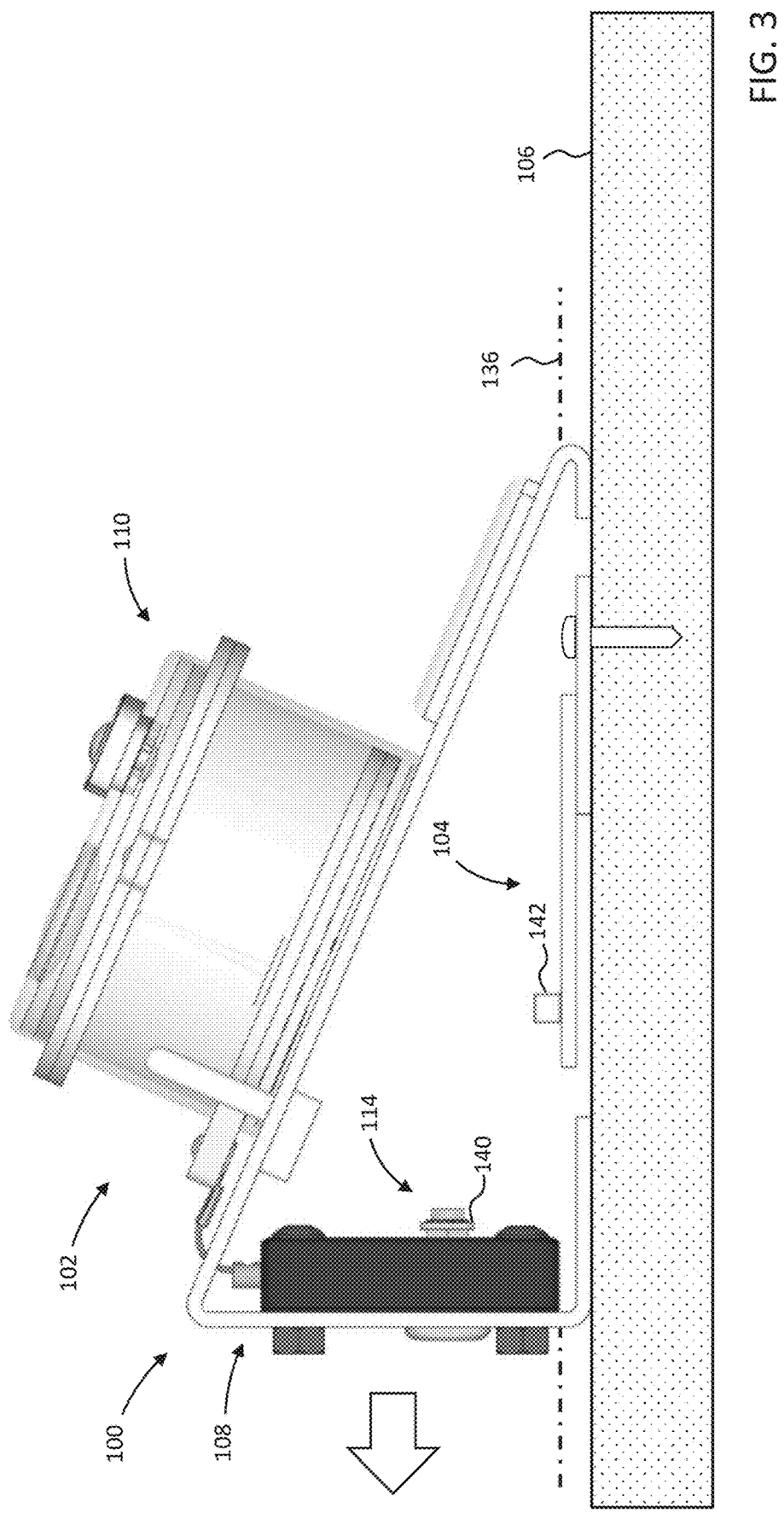
FIG. 3 is a cross-sectional view like that of FIG. 2, but showing the platform unlocked and disconnected from the base.

In the example illustrated, the display assembly 100 further includes a locking mechanism 114 integrated with the display stand 102. The locking mechanism 114 is operable to securely lock the platform 108 to the base 104 to prevent detachment of the platform 108 from the base 104, and to selectively unlock the platform 108 from the base 104 to permit detachment of the platform 108 from the base 104. In the example illustrated, the locking mechanism is moveable between a locked position (shown in FIG. 2) and an unlocked position (shown in FIG. 3). Referring to FIG. 2, when the locking mechanism 114 is in the locked position, the platform 108 is securely locked to the base 104 to prevent detachment of the platform 108 from the base 104, which can help prevent removal of the display containers fastened to the platform 108 from the premises. Referring to FIG. 3, when the locking mechanism 114 is in the unlocked position, the platform 108 is unlocked from the base 104 to permit detachment of the platform 108 from the base 104, for example, for transporting the platform 108 and the display container 110 fastened to the platform 108 away from the base 104. This can allow for the display container 110 to be securely displayed at a predetermined display location where the base 104 is securely affixed, and for convenient detachment and reattachment of the platform 108 and display container 110 for transport away from and back to the display location, which can facilitate servicing, replacement, and/or more secure storage (e.g. during store closure, overnight, etc.) of the display container 110 and articles contained therein.

Figure 4:
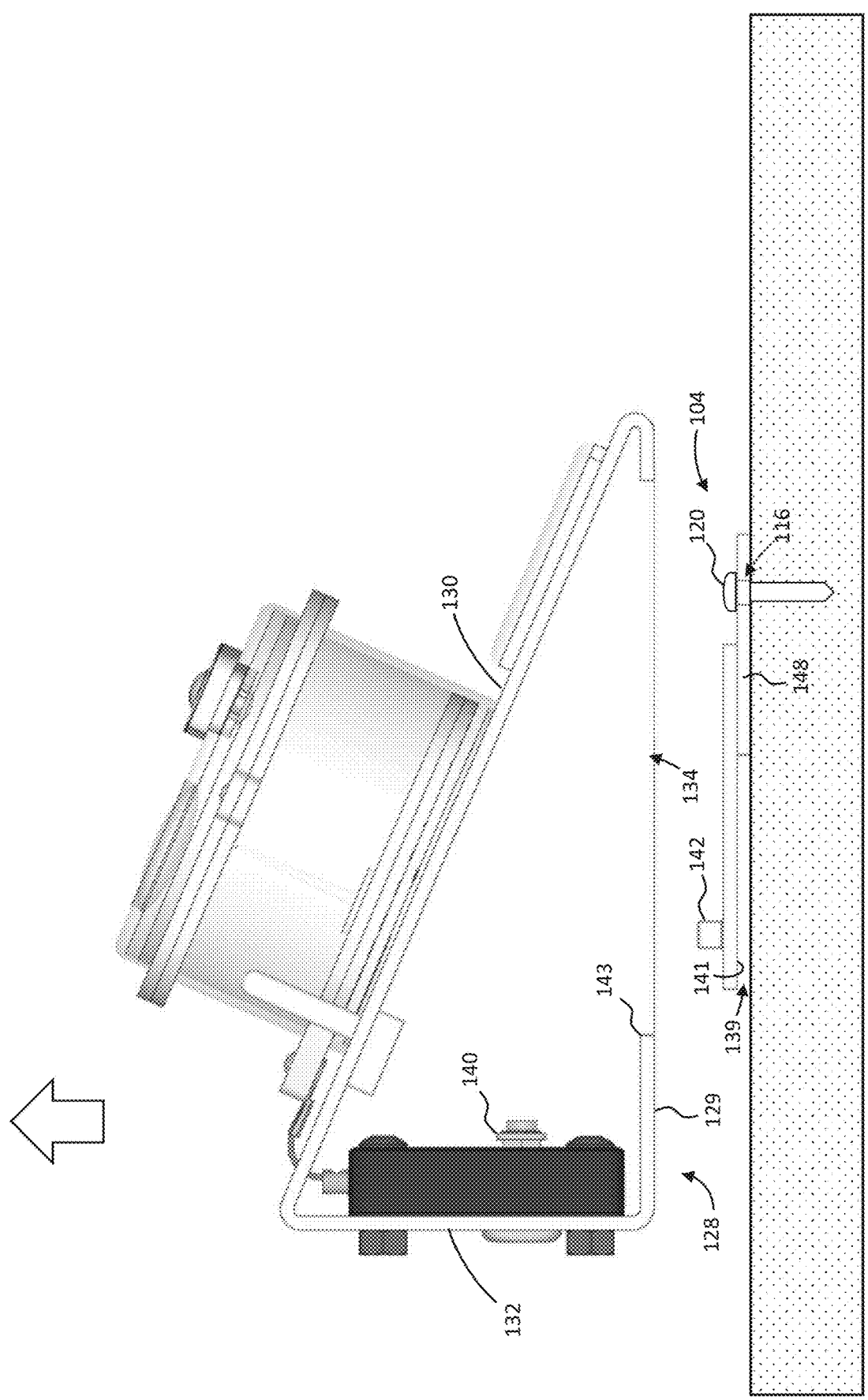
FIG. 4 is a cross-sectional view like that of FIG. 3, but showing the platform lifted off the base.
Figure 5:
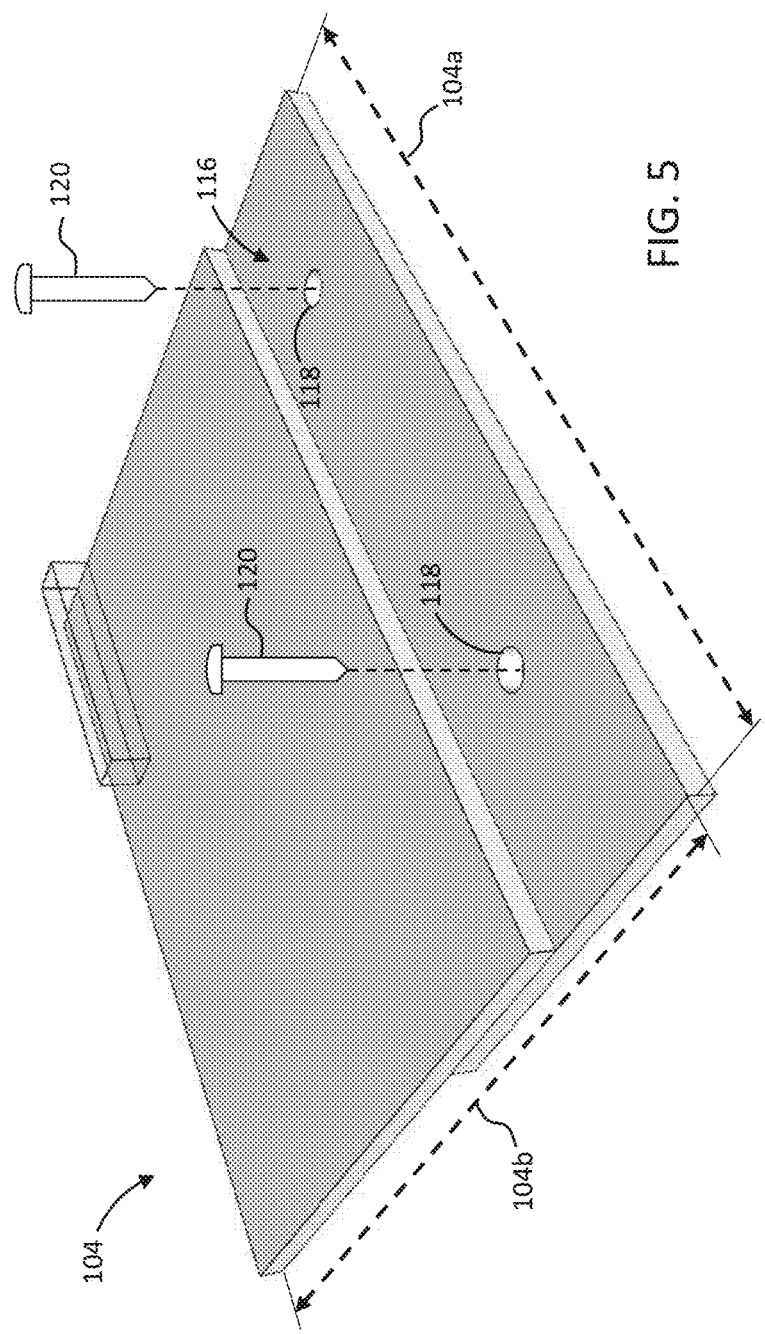
FIG. 5 is a perspective view of the base of the display assembly of FIG. 1.

Referring to FIG. 5, in the example illustrated, the base 104 includes one or more mounting features 116 for securing the base 104 to the support surface 106. The mounting features 116 are inaccessible when the base 104 is secured to the support surface 106 and the platform 108 is mounted to the base 104 (see e.g. FIG. 1). Referring to FIG. 4, in the example illustrated, the mounting features 116 are accessible when the platform 108 is detached from the base. This can help inhibit tampering of the mounting features 116 by blocking access to the mounting features 116 when the platform 108 (and display container 110) is locked to the base 104, and by providing access to the mounting features 116 only when the platform 108 is unlocked and (at least partially) removed from the base 104.

Referring to FIG. 5, in the example illustrated, the mounting features 116 include a plurality of mounting holes 118 for receiving fasteners 120 (e.g. screws, bolts, nails, anchors, etc.) to secure the base 104 to the support surface 106 (FIG. 2). In the example illustrated, the mounting holes 118 extend through the base 104 between an underside surface of the base 104 positionable over the support surface 106 and a topside surface of the base 104 opposite the underside surface. Referring to FIG. 2, in the example illustrated, the topside surface of the base 104 and the holes 118 are covered by the platform 108 when the platform 108 is mounted to the base 104. Referring to FIG. 4, in the example illustrated, the topside surface and the holes 118 (and fasteners 120 when the base 104 is secured to the support surface 106) are exposed when the platform 108 is detached from the base 104. In some examples, the mounting features 116 can comprise, for example, adhesive strips on the underside surface of the base 104 for adhering the base 104 to the support surface 106.

Referring to FIG. 1, in the example illustrated, the platform 108 conceals the base 104 when mounted, which can help inhibit tampering with the base 104 and may provide a more pleasing aesthetic. In the example illustrated, the platform 108 has a top wall 130 and a sidewall 132 extending downwardly from a periphery of the top wall 130 to an underside 128 of the platform 108 opposite the top wall 130.

Referring to FIG. 4, in the example illustrated, the underside has an opening 134 for receiving the base 104 to enclose the base within the platform 108 when mounted. Referring to FIG. 2, in the example illustrated, the sidewall 132 horizontally circumscribes the base 104 for concealment thereof when the platform 108 is mounted to the base 104. In the example illustrated, the underside 128 of the platform 108 rests on the support surface 106 when the platform 108 is mounted to the base 104.

In the example illustrated, the platform 108 extends along a platform axis 136 between a front and a rear of the platform 108. The sidewall 132 includes a front portion 132a at the front of the platform 108, a rear portion 132b axially opposite the front portion 132a and at the rear of the platform 108, and a pair of side portions 132c, 132d extending between the front and rear portions 132a, 132b on left and right sides of the platform 108. In the example illustrated, when the base is secured to the support surface 106 and the platform 108 is mounted to the base 104, the platform 108 has a generally enclosed interior 126. In the example illustrated, the top wall 130 and sidewall 132 of the platform bound the interior 126 from above and horizontally. In the example illustrated, the opening 134 is open (and provides access) to the interior 126. When the platform 108 is mounted to the secured base 104, the base 104 is enclosed within the interior 126 and the interior 126 is generally inaccessible.

Referring to FIG. 3, in the example illustrated, when the locking mechanism 114 is in the unlocked position, the platform 108 is horizontally slidable along the base 104 between a disconnected position (shown in FIG. 3) and an interconnected position (shown in FIG. 2). Referring to FIG. 3, when in the disconnected position, the platform 108 is clear of the base 104 to permit lifting of the platform 108 off the base 104 (see also FIG. 4). Referring to FIG. 2, when in the interconnected position, the platform 108 is interlocked with the base 104 to inhibit lifting of the platform 108 off the base 104 and the locking mechanism 114 is movable to the locked position to lock the platform 108 in the interconnected position.

In the example illustrated, the platform 108 is axially slidable (along the platform axis 136) relative to the base 104 between the interconnected and disconnected positions, and the base 104 serves as a track to guide axial translation of the platform 108 between the interconnected and disconnected positions. In the example illustrated, the base 104 is sized for positioning within the opening 134 in close lateral fit to inhibit lateral movement of the platform 108 relative to the base 104 while accommodating axial translation of the platform 108 relative to the base 104 between the interconnected and disconnected positions.

Figure 6:
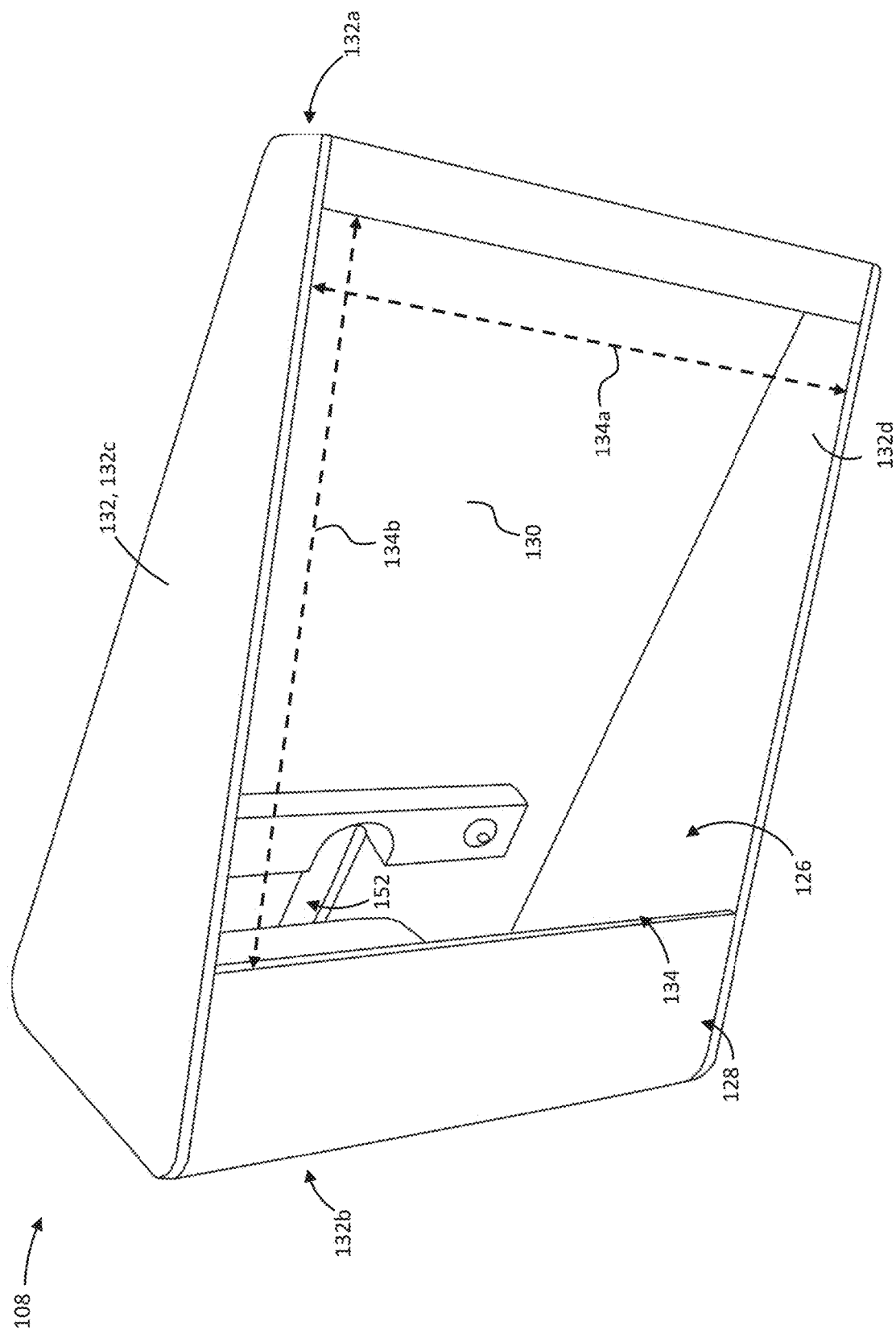
FIG. 6 is a perspective view of an underside of the platform of the display assembly of FIG. 1.
Figure 7:
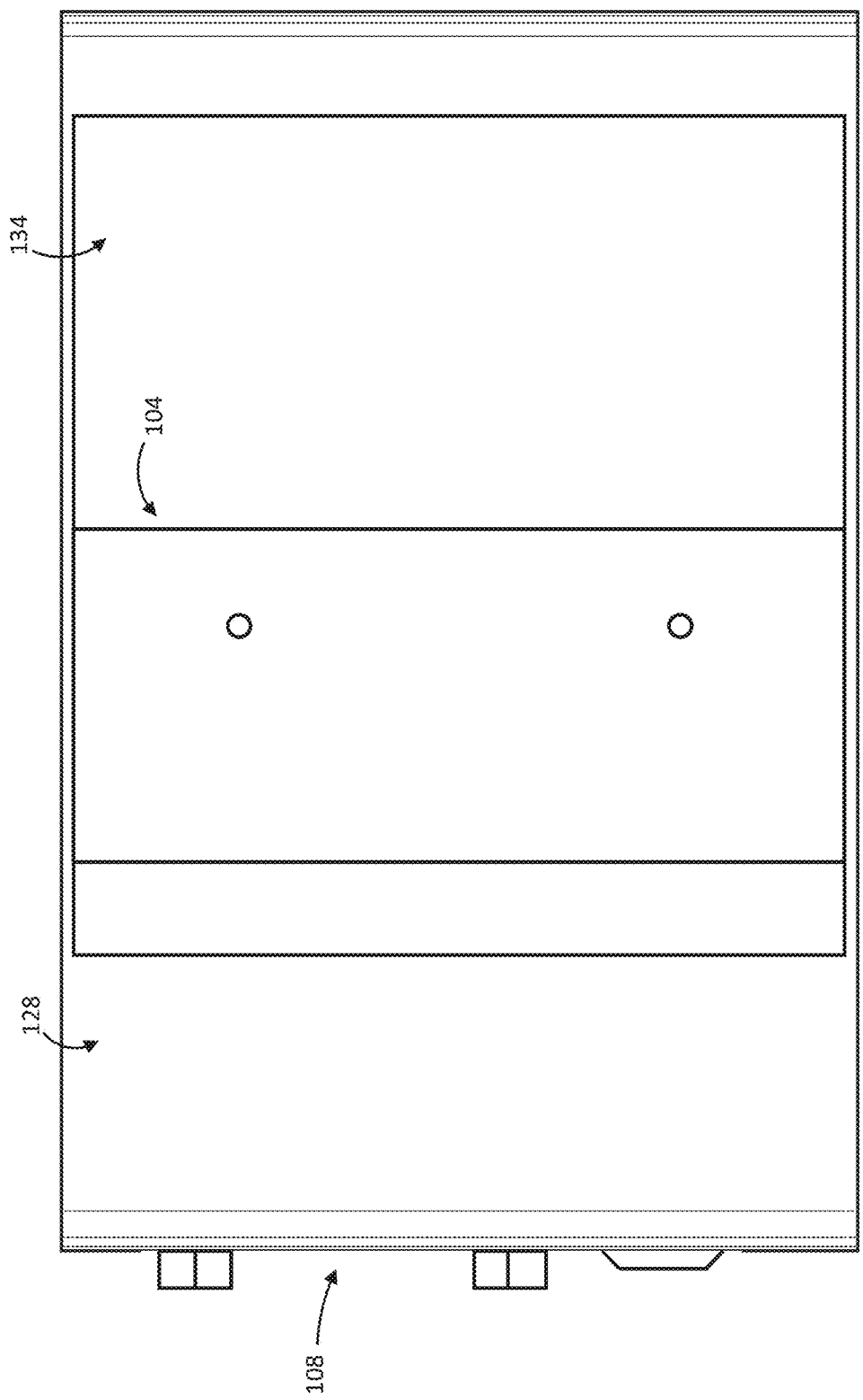
FIG. 7 is a bottom view of the display assembly of FIG. 1.

Referring to FIG. 6, in the example illustrated, each side portion 132c, 132d extends downwardly from the top wall 130 to a lower edge of the side portion 132c, 132d. The lower edges of the side portions 132c, 132d are generally parallel and spaced apart from each other by a sidewall spacing defining a lateral width 134a of the opening 134. Referring to FIG. 5, the base 104 has a generally constant width 104a corresponding to the width 134a (FIG. 6) of the opening 134 for close fit of the base 104 between the lower edges of the side portions 132c, 132d. In the example illustrated, the opening 134 has an axial length 134b (FIG. 6) greater than the axial length 104b of the base 104 to accommodate insertion of the base 104 through the opening 134 and to permit interconnection and disconnection through sliding of the platform 108 relative to the base 104.

Referring to FIG. 2, in the example illustrated, when the platform 108 is locked to the base 104 in the interconnected position, the base 104 prevents movement of the platform 108 in the direction transverse to the platform axis 136 and the locking mechanism 114 prevents movement of the platform 108 along the platform axis 136. Referring to FIG. 3, when the locking mechanism 114 is in the unlocked position, the platform 108 is movable along the platform axis 136 for detachment from the base 104.

Referring to FIG. 4, in the example illustrated, the base 104 has a recess 139 open horizontally (rearwardly, in the example illustrated) and bounded from above by a catch surface 141 fixed to the base 104. The platform 108 has a horizontal projection 143 on the underside 128 of the platform 108. The projection 143 is received in the recess 139 for engagement with the catch surface 141 when the platform 108 is in the interconnected position to interlock the platform 108 with the base 104 and inhibit lifting of the platform 108 off the base 104. The projection 143 is removed from the recess 139 clear of the catch surface 141 when the platform 108 is in the disconnected position to permit lifting of the platform 108 off the base 104.

In the example illustrated, the projection 143 comprises a bottom wall portion 129 of the platform 108 projecting horizontally from the sidewall 132 to an inner edge defining a periphery of the opening 134. In the example illustrated, the bottom wall portion 129 is on the underside 128 of the platform 108 opposite the top wall 130. The bottom wall portion 129 projects axially forward from a lower edge of the rear portion 132b to the inner edge defining a rear periphery of the opening 134. The bottom wall portion 129 extends laterally between lower edges of the side portions 132c, 132d.

In the example illustrated, the catch surface 141 is spaced vertically apart from the support surface 106 by a vertical gap defining the recess 139. In the example illustrated, the base 104 includes an anchor portion 148 (in the form of an anchor plate in the example illustrated) comprising the mounting features 116 and fixable to the support surface 106 for securing the base 104 to the support surface 106. In the example illustrated, the catch surface 141 projects horizontally (rearwardly, in the example illustrated) from the anchor portion 148 overtop of the support surface 106 to define the recess 139 vertically therebetween. In the example illustrated, the catch surface 141 comprises a catch plate oriented generally horizontally and mounted atop and offset rearwardly from the anchor plate 148.

In the example illustrated, the locking mechanism 114 includes a latch 140 rotatably mounted to the platform 108, and a strike surface 142 fixed relative to the base 104. The latch 140 is positioned for engagement with the strike surface 142 when the platform 108 is mounted to the base 104 in the interconnected position and the locking mechanism 114 is in the locked position, to prevent detachment of the platform 108 from the base 104. The latch 140 is clear of the strike surface 142 when the locking mechanism 114 is in the unlocked position (FIGS. 3 and 4) to permit the platform 108 to be mounted to and detached from the base 104.

In the example illustrated, the strike surface 142 comprises a strike plate projecting vertically from an upper surface of the catch plate. Referring to FIG. 2, in the example illustrated, the locking mechanism 114 is key-operated, and includes a key slot portion 146 for receiving a key to move the locking mechanism 114 (the latch 140, in the example illustrated) between the locked and unlocked positions. In the example illustrated, the latch 140 and key slot portion 146 are mounted to the rear portion 132b of the platform. The key slot 146 is accessible from the rear of the platform, and the latch 140 is within the interior 126 of the platform 108.

In some examples, instead of or in addition to utilizing a key-operated latch, the locking mechanism can include a plurality of fasteners operable to securely fasten the platform 108 to the base 104 for locking the platform 108 to the base 104, and to unfasten the platform 108 from the base 104 for unlocking the platform 108 from the base 104. For example, when the platform is mounted to the base, each fastener can be inserted through a respective fastener aperture in the platform and into threaded engagement with internal threading fixed relative to the base and in alignment with the fastener aperture of the platform. The locking mechanism can be moved to the locked position by screwing each fastener into the internal threading to lock the platform to the base, and to the unlocked position by unscrewing each fastener from the internal threading fixed relative to the base. In some examples, a respective fastener, aperture, and internal threading can be provided on each side of the display container to fasten the platform to the base from each side of the display container.

Referring to FIG. 2, in the example illustrated, the display assembly 100 further includes at least one retractable security tether 150 securely fastening the display container 110 to the platform 108. Referring to FIG. 8, in the example illustrated, the retractable tether 150 permits limited movement of the display container 110 away from the platform 108 to facilitate viewing and closer inspection of the articles 50 therein, and urges the display container 110 back toward a predetermined resting position atop the platform 108 (shown in FIGS. 1-4).

Referring to FIG. 6, in the example illustrated, a tether port 152 passes through the platform 108 between the interior 126 and an exterior environment. Referring to FIG. 8, in the example illustrated, the retractable tether 150 is mounted to the platform 108 in the interior 126 and extends through the tether port 152 (FIG. 6) to the display container 110. In the example illustrated, the tether port 152 passes through the top wall 130 of the platform 108, and is located toward the rear of the platform 108.

In the example illustrated, the retractable tether 150 comprises a retraction mechanism 156 mounted in the interior 126 and a tether line 158 (e.g. a cable) extending through the tether port 152 between a proximal end coupled to the retraction mechanism 156 in the interior 126 and a distal end secured to the display container 110. The distal end can be secured to the display container 110 through, for example, a loop and fastener connection, adhesive, and/or in any other suitable manner.

In the example illustrated, the tether line 158 is extendible from the retraction mechanism 156 to accommodate movement of the display container 110 away from the platform 108 (as shown in FIG. 8), and the retraction mechanism 156 urges retraction of the tether line 158 back into the retraction mechanism 156 for returning the display container 110 back toward the resting position atop the platform 108 (as shown in FIG. 2). In the example illustrated, the retraction mechanism 156 includes a casing 160 mounted in the interior 126 to an inner surface of the platform 108, a spring-loaded reel in the casing 160 and around which the tether line 158 is wound for urging retraction of the tether line 158 into the casing 160, and a casing opening through which the tether line 158 extends from within the casing 160. In the example illustrated, the retractable tether 150 is mounted to the rear portion 132b of the platform 108, with the casing opening in alignment with the tether port 152.

Referring to FIG. 8, in the example illustrated, the display container 110 has a container body 111 extending along a container axis 164 between a bottom portion 168 for positioning atop the platform 108 and a top portion 166 vertically opposite and detachably mounted to the bottom portion 168 to generally enclose the interior of the container 110. In the example illustrated, the top portion 166 comprises a generally transparent viewing surface 169 oriented normal to the container axis 164 and through which articles in the container 110 can be viewed. In the example illustrated, the viewing surface 169 comprises an integrated viewing lens for viewing the articles 50 in the display container 110. In the example illustrated, the bottom portion 168 is also generally transparent.

In the example illustrated, the top wall 130 of the platform 108 is generally planar and slopes downwardly from the rear to the front of the platform 108. Referring to FIG. 2, when the display container 110 is resting atop the sloped top wall 130, the viewing surface 169 is inclined from horizontal toward the front of the platform 108 to facilitate viewing of the one or more articles.

Referring to FIG. 8, in the example illustrated, the platform 108 includes one or more stop members 170 projecting outwardly from an exterior surface of the top wall 130. The stop members 170 are positioned generally forward of the tether port 152 (FIG. 6) and define the resting position toward which the tether 150 urges the display container 110. The tether 150 urges the display container 110 rearwardly into engagement with a front of the stop members 170, and the stop members 170 limit rearward movement of the display container along the top wall 130 past the resting position.

In the example illustrated, the one or more stop members 170 include a pair of posts 172 spaced laterally apart by a post spacing (see also FIG. 1). The tether port 152 (and the casing opening of the casing 160) is laterally intermediate and generally rearward of the posts 172, and the tether line 158 is extendable between the posts 172 and urges the container rearwardly into the post spacing and into engagement against the posts 172. The post spacing is less than a width of the container body 111 to inhibit the container body 111 from passing through the post spacing. In the example illustrated, the container 110 includes a tether bracket 174 projecting rearward from a lower end of the container body 111. When the container 110 is in the resting position (in engagement with the posts 172), the bracket 174 extends through the post spacing and over the tether port 152.

Referring to FIG. 8, in the example illustrated, the top portion 166 of the container 110 comprises a lid and is detachably locked to the bottom portion 168 of the container 110. The lid is generally transparent for viewing of the article therethrough, and in the example illustrated, comprises the integrated lens through which the article is viewable. In the example illustrated, the container 110 includes a locking ring 180 for detachably locking the top portion 166 to the bottom portion 168.

In the example illustrated, the display container 110 includes a plurality of scent ports 188 extending between the interior of the display container and an exterior of the container body 111, and a plug 190 sealing the scent ports 188. The plug 190 is movable away from the scent ports 188 to expose the scent ports 188 and facilitate sampling of an aroma of the articles in the display container 110. In the example illustrated, the scent ports 188 are in the lid of the display container 110, and the plug 190 is movably mounted to the lid.

Referring to FIG. 8, in the example illustrated, the display container 110 further includes a retainer 192 in the interior of the display container 110 for retaining the article at a predetermined location in the interior. In the example illustrated, the retainer 192 includes an elongate mounting projection. In the example illustrated, the mounting projection comprises a spike for piercing the one or more articles to retain the articles on the projection.

Referring to FIG. 1, in the example illustrated, the display assembly 100 further includes an information display system 196 integrated with the display stand adjacent the display container 110 for displaying information about the articles in the display container 110. In the example illustrated, the display system 196 comprises a card holder 198 attached to the top wall 130 of the platform 108 in front of the display container 110 (when in the resting position atop the platform 108). The card holder 198 is shaped to receive and hold an information card displaying the information about the one or more articles.

In some examples, the display assembly of the present specification can be adapted for display of a plurality of display containers. The plurality of display containers can be supported side by side atop and fastened to a common platform through a plurality of respective tethers mounted in the interior of the common platform. The common platform can be detachably mountable and lockable to a base in a similar manner as described above for the display assembly 100.

The invention claimed is:

1. A display assembly for secure display of articles, comprising:
    a) a display stand including a base securable to a secure support surface and a platform detachably mounted to and concealing the base, the platform having a top wall and a sidewall extending downwardly from a periphery of the top wall to an underside of the platform opposite the top wall, the underside having an opening receiving the base to enclose the base within the platform;
    b) at least one display container supported atop and fastened to the platform, at least a portion of the display container being generally transparent for viewing one or more articles containable therein for display; and
    c) a locking mechanism integrated with the display stand and including at least one locking member movable relative to a respective locking surface between a locked position, in which the locking member is positioned for engagement with the locking surface to securely lock the platform to the base for preventing detachment of the platform from the base, and an unlocked position in which the locking member is clear of the locking surface for unlocking the platform from the base to permit detachment of the platform from the base.

2. The display assembly of claim 1, wherein the sidewall horizontally circumscribes the base for concealment thereof.

3. The display assembly of claim 1, wherein when the platform is unlocked from the base, the platform is horizontally slidable along the base between a disconnected position in which the platform is clear of the base to permit lifting of the platform off the base, and an interconnected position in which the platform is interlocked with the base to inhibit lifting of the platform off the base and the locking member is movable from the unlocked position to the locked position to lock the platform in the interconnected position.

4. The display assembly of claim 3, wherein the base is sized for positioning within the opening in close lateral fit to inhibit lateral movement of the platform relative to the base while accommodating axial translation of the platform relative to the base between the interconnected and disconnected positions.

5. The display assembly of claim 3, wherein the base has a recess open horizontally and bounded from above by a catch surface fixed to the base, and the platform has a horizontal projection on the underside of the platform, the projection received in the recess for engagement with the catch surface when the platform is in the interconnected position to interlock the platform with the base, and the projection removed from the recess clear of the catch surface when the platform is in the disconnected position.

6. The display assembly of claim 5, wherein the projection comprises a bottom wall portion of the platform projecting horizontally from the sidewall to an inner edge defining a periphery of the opening.

7. The display assembly of claim 1, wherein the locking member comprises a latch rotatably mounted to the platform and the locking surface comprises a strike surface fixed relative to the base, the latch positioned for engagement with the strike surface in the locked position, and the latch clear of the strike surface in the unlocked position.

8. The display assembly of claim 1, wherein the base includes one or more mounting features for securing the base to the support surface, the mounting features inaccessible when the base is secured to the support surface and the platform is mounted to the base, and the mounting features accessible when the platform is detached from the base.

9. The display assembly of claim 1, further comprising at least one retractable tether securely fastening the at least one display container to the platform, each retractable tether permitting limited movement of the display container away from the platform to facilitate viewing of the one or more articles, and urging the display container back toward a resting position atop the platform.

10. The display assembly of claim 9, wherein the retractable tether is mounted within an interior of the platform and extends to the display container through a tether port in the top wall of the platform.

11. The display assembly of claim 10, wherein the display stand has at least one stop member projecting from an exterior surface of the top wall and positioned generally forward of the tether port, the stop member limiting rearward movement of a respective display container past the resting position.

12. The display assembly of claim 11, wherein the display container extends along a container axis between a top and a bottom vertically opposite the top, the top comprising a generally transparent viewing surface normal to the container axis and through which the articles are viewable.

13. The display assembly of claim 9, wherein the top wall slopes downwardly from a rear to a front of the platform, and when in the resting position, the display container is supported atop the top wall with the viewing surface inclined from horizontal toward the front of the display stand to facilitate viewing of the one or more articles.

14. The display assembly of claim 1, further comprising an information display system integrated with the display stand adjacent the display container for displaying information about the one or more articles.

15. The display assembly of claim 14, wherein the display system comprises at least one card holder attached to the top wall of the platform and shaped to receive and hold an information card providing the information about the one or more articles.

16. A display assembly for secure display of articles, comprising:
   a) a display stand including a base securable to a secure support surface and a platform detachably mounted to and concealing the base;
   b) at least one display container supported atop and fastened to the platform, at least a portion of the display container being generally transparent for viewing one or more articles containable therein for display; and
   c) a locking mechanism integrated with the display stand and including at least one locking member movable relative to a locking surface between a locked position in which the locking member is positioned for engagement with the locking surface to securely lock the platform to the base for preventing detachment of the platform from the base, and an unlocked position in which the locking member is moved clear of the locking surface for unlocking the platform from the base to permit detachment of the platform from the base.

17. The display assembly of claim 16, wherein the base is enclosed within the platform.

18. The display assembly of claim 16, further comprising a retractable tether securely fastening the display container to the platform, the retractable tether permitting limited movement of the display container away from the platform to facilitate viewing of the one or more articles, and urging the display container back toward a resting position atop the platform.

19. The display assembly of claim 18, wherein the retractable tether is mounted within the platform and extends to the display container through a tether port in the platform.

* * * * *